US012608659B2

(12) United States Patent
Varughese et al.

(10) Patent No.: US 12,608,659 B2
(45) Date of Patent: Apr. 21, 2026

(54) ROLLING CODE BASED POINT OF ACCESS SYSTEM FOR EVENT TICKETS STORED IN MOBILE ACCESS DEVICES

(71) Applicant: DENSO International America, Inc., Southfield, MI (US)

(72) Inventors: Sibu Varughese, Sterling Heights, MI (US); Martín Nespolo, Grosse Pointe Woods, MI (US); Gareth Webb, New Hudson, MI (US); Thomas Krzyzak, Livonia, MI (US); Wilson Yim, Ann Arbor, MI (US); Matthew Johnson, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 18/388,888

(22) Filed: Nov. 13, 2023

(65) Prior Publication Data

US 2024/0078476 A1     Mar. 7, 2024

Related U.S. Application Data

(62) Division of application No. 16/942,942, filed on Jul. 30, 2020, now Pat. No. 11,823,096.

(51) Int. Cl.
*G06Q 10/02* (2012.01)
*G07C 9/00* (2020.01)

(52) U.S. Cl.
CPC ......... *G06Q 10/02* (2013.01); *G07C 9/00309* (2013.01); *G07C 9/00896* (2013.01); *G07C 2009/00436* (2013.01)

(58) Field of Classification Search
CPC ........ G06Q 10/02; G06Q 50/30; G06Q 50/14; G06Q 50/12; G06Q 50/10
See application file for complete search history.

(56) References Cited

U.S. PATENT DOCUMENTS 8,699,713 B1 *    4/2014    Rivest .................. H04L 63/068
                                                          380/277
9,688,247 B1      6/2017    Jayaraman et al.
                              (Continued)

FOREIGN PATENT DOCUMENTS

BR      102014017465 A2    2/2016
CN          104574593 A    4/2015
                (Continued)

OTHER PUBLICATIONS

Hegde, "QR Codes for events: How to employ QR Codes for ticketing," Published by blog.beaconstac.com, Nov. 22, 2019, Retrieved from https://web.archive.org/web/20200711192559/https://blog.beaconstac.com/2019/11/qr-codes-for-events-how-to-employ-qr-codes-for-ticketing/ (Year: 2019).*

*Primary Examiner* — Shannon S Campbell
*Assistant Examiner* — Bryan J Kirk
(74) *Attorney, Agent, or Firm* — Harness, Dickey & Pierce, P.L.C.

(57) ABSTRACT

A system for providing ticket based authorized entry of a mobile access device includes a memory, a transceiver and a control module. The memory stores an access code of a ticket of an event to be accessed by the mobile access device. The mobile access device also stores the access code. The control module: determines an amount of time since the ticket was purchased or an amount of time since the access code of the ticket was last updated; and updates the access code stored in the memory and signals the mobile access device via the transceiver to update the access code stored at the mobile access device in response to the amount of time since the ticket was purchased exceeding a first predetermined amount of time or the amount of time since the access code of the ticket was last updated exceeding a second predetermined amount of time.

18 Claims, 8 Drawing Sheets

(56) References Cited

U.S. PATENT DOCUMENTS

| | | | |
|---|---|---|---|
| 9,794,753 B1 | 10/2017 | Stitt et al. | |
| 9,894,492 B1 | 2/2018 | Elangovan et al. | |
| 10,002,479 B2 | 6/2018 | Oz et al. | |
| 10,244,476 B2 | 3/2019 | Elangovan et al. | |
| 10,328,898 B2 | 6/2019 | Golsch et al. | |
| 10,328,899 B2 | 6/2019 | Golsch | |
| 10,328,900 B1 | 6/2019 | Yakovenko et al. | |
| 2001/0050615 A1 | 12/2001 | Kucharczyk et al. | |
| 2011/0215921 A1 | 9/2011 | Ben Ayed et al. | |
| 2012/0045058 A1 | 2/2012 | Weghaus | |
| 2014/0039945 A1* | 2/2014 | Coady | G06Q 10/02 |
| | | | 705/5 |
| 2014/0274013 A1 | 9/2014 | Santavicca | |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0150407 A1 | 5/2016 | Michaud et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |
| 2018/0367469 A1* | 12/2018 | Re | G06F 9/468 |
| 2019/0058591 A1* | 2/2019 | Sharpe | G06Q 20/38215 |
| 2019/0193678 A1 | 6/2019 | Leiber | |
| 2019/0236852 A1* | 8/2019 | Ito | G06Q 20/04 |
| 2019/0246276 A1* | 8/2019 | Lingala | H04W 12/08 |
| 2019/0286835 A1* | 9/2019 | Werneke | H04L 47/6275 |

FOREIGN PATENT DOCUMENTS

| | | |
|---|---|---|
| WO | 16156682 A1 | 10/2016 |
| WO | 2017181050 A1 | 10/2017 |
| WO | 18040641 A1 | 3/2018 |

* cited by examiner

100

102

Security Central Monitoring Station

110

Rolling Code Generating Module

Mobile Access Device₁

Access Module

112

Memory

Codes

104A

114

108

104

Mobile Access Device₂

104

Mobile Access Deviceₙ

Check Point Station₁

106A

Verification Module

116

106

Check Point Station₂

106

Check Point Stationₘ

ROLLING CODE BASED POINT OF ACCESS SYSTEM FOR EVENT TICKETS STORED IN MOBILE ACCESS DEVICES

CROSS-REFERENCE TO RELATED APPLICATIONS

This application is a divisional of U.S. patent application Ser. No. 16/942,942 filed on Jul. 30, 2020. The entire disclosure of the above application is incorporated herein by reference.

FIELD

The present disclosure relates to point of access security systems for ticket required access events.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An attendee to an event, such as a sporting event or a concert, can gain access to the event by purchasing a ticket online and downloading and presenting the ticket to an attendant at the venue of the event. The ticket may be downloaded to the attendee's personal cellular phone and/or other portable network device. As an example, the portable network device may receive an encrypted code (e.g., QR code) when the ticket is purchased. The attendee may then, on the day of the event, have the code scanned at a point of entry in order to be permitted into the facility of the event. The attendant may scan the code or the attendee may hold the code in front of a scanner at, for example, a turnstile point of entry.

A passenger of a vehicle (e.g., an automobile, a bus, a train or an airplane) may similarly purchase a ticket online and present the ticket in the form of a QR code at a point of entry. For example, the passenger may have the QR code scanned by a vehicle attendant and/or a scanner of the vehicle prior to being permitted to enter the vehicle and/or the vehicle leaving a departure location.

SUMMARY

A system for providing ticket based authorized entry of a mobile access device. The system includes a memory, a transceiver and a control module. The memory is configured to store an access code of a ticket of an event to be accessed by the mobile access device using the ticket. The mobile access device stores the access code. The transceiver is configured to communicate with the mobile access device. The control module is configured to: determine when the ticket was purchased; determine at least one of (i) an amount of time since the ticket was purchased, or (ii) an amount of time since the access code of the ticket was last updated; and updates the access code stored in the memory and signals the mobile access device via the transceiver to update the access code stored at the mobile access device in response to at least one of (i) the amount of time since the ticket was purchased exceeding a first predetermined amount of time, or (ii) the amount of time since the access code of the ticket was last updated exceeding a second predetermined amount of time. Access to the event by the mobile access device and a corresponding ticket holder is based on the updated access code.

In other features, the control module is configured to (i) determine the amount of time since the ticket was purchased, and (ii) update the access code stored in the memory and signal the mobile access device to update the access code stored at the mobile access device in response to the amount of time since the ticket was purchased having exceeded the first predetermined amount of time.

In other features, the control module is configured to (i) determine the amount of time since the access code of the ticket was last updated, and (ii) update the access code stored in the memory and signal the mobile access device to update the access code stored at the mobile access device in response to the amount of time since the access code of the ticket was last updated having exceeded the second predetermined amount of time.

In other features, the control module is configured to periodically, pseudo-randomly or randomly signal the mobile access device to update the access code stored in the memory and signal the mobile access device to update the access code stored at the mobile access device prior to the ticket being used to gain entry to the event.

In other features, the control module is configured to (i) determine a location of the mobile access device, and (ii) signal the mobile access device to update the access code stored in the memory and signal the mobile access device to update the access code stored at the mobile access device when the mobile access device is within a predetermined distance of a point of entry of the event.

In other features, the system is configured to: receive the access code stored at the mobile access device; compare the access code received from the mobile access device to the updated access code; determine whether the received access code from the mobile access device is valid; and in response to determining that the access code received from the mobile access device is valid, actuate an entry device to provide permitted passage to the event for the ticket holder of the mobile access device.

In other features, the control module is configured to, when updating the access code stored in the memory append a new access code to at least a portion of a previous access code.

In other features, a system is provided for ticket based authorized entry of a mobile access device. The system includes a memory, a transceiver and a control module. The memory is configured to store an access code corresponding to a ticket of an event to be accessed by the mobile access device, where the mobile access device stores the access code. The transceiver is configured to communicate with the mobile access device. The control module is configured to: determine a location of the mobile access device relative to a check point location for the event; determine whether the mobile access device is at or closer to a point of entry of the event than the check point location; and in response to the determining that the mobile access device is at or closer to the point of entry than the check point location, update the access code stored in the memory and signal the mobile access device via the transceiver to update the access code stored at the mobile access device. Access to the event by the mobile access device and a corresponding ticket holder is based on the updated access code.

In other features, the control module is configured to iteratively, for each check point passed by the mobile access device, update the access code in the memory and the access code stored at the mobile access device.

In other features, the control module is configured to (i) monitor movement of the mobile access device, and (ii) while the mobile access device is moving and is within a predetermined range of the check point location, update the access code stored in the memory and signal the mobile access device to update the access code stored at the mobile access device.

In other features, the system is configured to: receive the access code stored at the mobile access device; compare the access code received from the mobile access device to the updated access code; determine whether the received access code from the mobile access device is valid; and in response to determining that the access code received from the mobile access device is valid, actuate an entry device to provide permitted passage to the event for the ticket holder of the mobile access device.

In other features, the control module is configured to update the access code stored in the memory based on an amount of time since the ticket was purchased by the ticket holder associated with the mobile access device.

In other features, the control module is configured to, when updating the access code stored in the memory append a new access code to at least a portion of the access code stored in the memory or at least a portion of the updated access code.

In other features, the control module is configured to, when updating the access code stored in the memory append a new access code to at least a portion of the access code stored in the memory or at least a portion of the updated access code.

In other features, a station for providing ticket based authorized entry of a mobile access device is provided. The station includes a memory, a transceiver and a control module. The memory is configured to store an access code of a ticket of an event to be accessed by the mobile access device using the ticket. The mobile access device stores the access code. The transceiver is configured to communicate with the mobile access device. The control module is configured to: determine when the ticket was purchased; determine at least one of (i) an amount of time since the ticket was purchased, or (ii) an amount of time since the access code of the ticket was last updated; and updates the access code stored in the memory and signals the mobile access device via the transceiver to update the access code stored at the mobile access device in response to at least one of (i) the amount of time since the ticket was purchased exceeding a first predetermined amount of time, or (ii) the amount of time since the access code of the ticket was last updated exceeding a second predetermined amount of time. Access to the event by the mobile access device and a corresponding ticket holder is based on the updated access code.

In other features, the control module is configured to (i) determine the amount of time since the ticket was purchased, and (ii) update the access code stored in the memory and signal the mobile access device to update the access code stored at the mobile access device in response to the amount of time since the ticket was purchased having exceeded the first predetermined amount of time.

In other features, the control module is configured to (i) determine the amount of time since the access code of the ticket was last updated, and (ii) update the access code stored in the memory and signal the mobile access device to update the access code stored at the mobile access device in response to the amount of time since the access code of the ticket was last updated having exceeded the second predetermined amount of time.

In other features, the control module is configured to periodically, pseudo-randomly or randomly signal the mobile access device to update the access code stored in the memory and signal the mobile access device to update the access code stored at the mobile access device prior to the ticket being used to gain entry to the event.

In other features, the control module is configured to (i) determine a location of the mobile access device, and (ii) signal the mobile access device to update the access code stored in the memory and signal the mobile access device to update the access code stored at the mobile access device when the mobile access device is within a predetermined distance of a point of entry of the event.

In other features, the station is configured to: receive the access code stored at the mobile access device; compare the access code received from the mobile access device to the updated access code; determine whether the received access code from the mobile access device is valid; and in response to determining that the access code received from the mobile access device is valid, actuate an entry device to provide permitted passage to the event for the ticket holder of the mobile access device.

In other features, the control module is configured to, when updating the access code stored in the memory append a new access code to at least a portion of a previous access code.

In other features, a station for providing ticket based authorized entry of a mobile access device is provided. The station includes a memory, a transceiver and a control module. The memory is configured to store an access code corresponding to a ticket of an event to be accessed by the mobile access device. The mobile access device stores the access code. The transceiver is configured to communicate with the mobile access device. The control module is configured to: determine a location of the mobile access device relative to a check point location for the event; determine whether the mobile access device is at or closer to a point of entry of the event than the check point location; and in response to the determining that the mobile access device is at or closer to the point of entry than the check point location, update the access code stored in the memory and signal the mobile access device via the transceiver to update the access code stored at the mobile access device. Access to the event by the mobile access device and a corresponding ticket holder is based on the updated access code.

In other features, the control module is configured to iteratively, for each check point passed by the mobile access device, update the access code in the memory and the access code stored at the mobile access device.

In other features, the control module is configured to (i) monitor movement of the mobile access device, and (ii) while the mobile access device is moving and is within a predetermined range of the check point location, update the access code stored in the memory and signal the mobile access device to update the access code stored at the mobile access device.

In other features, the station is configured to: receive the access code stored at the mobile access device; compare the access code received from the mobile access device to the updated access code; determine whether the received access code from the mobile access device is valid; and in response to determining that the access code received from the mobile access device is valid, actuate an entry device to provide permitted passage to the event for the ticket holder of the mobile access device.

In other features, the control module is configured to update the access code stored in the memory based on an amount of time since the ticket was purchased by the ticket holder associated with the mobile access device.

In other features, the control module is configured to, when updating the access code stored in the memory append a new access code to at least a portion of the access code stored in the memory or at least a portion of the updated access code.

In other features, A mobile access device is provided and includes a memory, a transceiver and a control module. The memory is configured to store an access code of a ticket for an event. The transceiver is configured to communicate with a first station of the event. The control module is configured to: receive a signal from the first station to update the access code based on time since the ticket was purchased or a location of the mobile access device; update the access code stored in the memory based on the signal; show or transmit the updated access code to the first station or a second station as an access request when the mobile access device is at a point of entry; and receive a signal from the first station or the second station indicating a status of the access request.

In other features, the control module is configured to update the access code stored in the memory without receiving an updated access code from a station.

In other features, the control module is configured to select a next access code in a list of access codes stored in the memory in response to receiving the signal to update the access code.

In other features, the control module is configured to generate the updated access code based on a predetermined algorithm stored in the memory.

In other features, the signal includes an updated access code for the ticket; and the control module replaces the access code stored in the memory with the updated access code included in the signal.

In other features, the control module is configured to append a new access code to at least a portion of the access code stored in the memory when updating the access code stored in the memory.

In other features, the control module is configured to: append a first new access code to the access code stored in the memory to form an updated access code when the mobile access device passes the point of entry a first time; and either (i) append a second new access code to the first new access code and drop a remainder of the updated access code when the mobile access device passes the point of entry a second time, or (ii) append the second new access code to the remainder of the updated access code and drop the first new access code when the mobile access device passes the point of entry the second time.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A purchaser of a ticket (referred to herein as the "ticket holder") for an event may have a ticket in the form of an encrypted code stored on a mobile access device (e.g., cellular phone, tablet, wearable device, etc.). The encrypted code may be in the form of a QR code or other encrypted code, which is shown at the venue to gain access to the event. Prior to arriving at the venue on the day of the event and/or prior to being at the point of access to the event, an attacking device of a cyber criminal may attack the mobile access device and/or perform a spoofing process to copy and/or download the encrypted code. The user of the attacking device may then access the event prior to the ticket holder, thereby preventing the ticket holder from accessing the event.

The examples set forth herein include a mobile access device of a ticket holder obtaining updated encrypted access codes for a ticket to thereby prevent an attacking device from in effect stealing the ticket of the ticket holder. The updated encrypted codes may be provided based on time and/or geographical locations of the mobile access device. In one embodiment, the provided encrypted codes are appended to previous encrypted codes and collectively used to verify whether the mobile access device and user of the mobile device are authorized to access the event. The encrypted codes may be generated using rolling code generators, which may provide a next rolling code and/or other credentials for accessing the event. These examples allow credentials to be reissued and/or updated up until the mobile access device of the ticket holder is within a predetermined distance of a point of entry of the event. As an example, the point of entry may be at a turnstile, a gated entrance, at or near an x-ray scanner at an entryway, at a doorway, at an entrance of a vehicle, etc.

Figure 1:
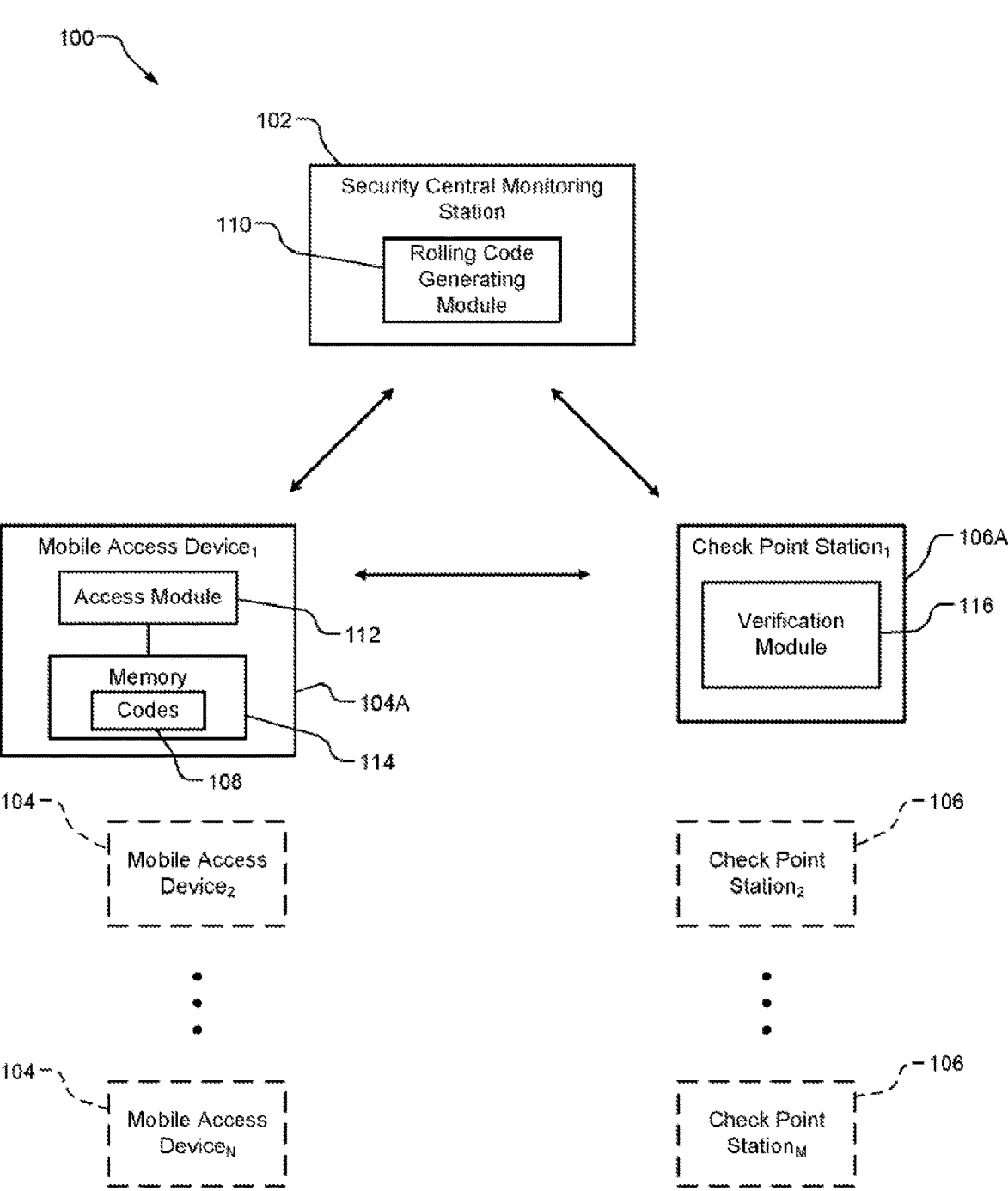
FIG. 1 is a functional block diagram of an example of a security access system including a security central monitoring station, mobile access devices and check point stations in accordance with an embodiment of the present disclosure.

FIG. 1 shows a security access system 100 that includes a security central monitoring station, 102, one or more mobile access devices 104, and one or more check point stations 106. The security central monitoring station 102 may be remotely located from the mobile access devices 104 and the check point stations 106. In the example shown, the mobile access device 104A stores encrypted codes 108 including one or more access codes and one or more user

7 | 8 and mobile access device identification and authorization codes. The access codes are associated with a purchased ticket purchased by a ticket holder. The ticket holder may own and/or have authorized access to the mobile access device 104A. The security central monitoring station 102 provides, updates and/or initiates updating of the encrypted access codes. The encrypted access codes may be shared with one or more of the check point stations 106 that are at a point of entry to the event associated with the ticket. In one embodiment, the security central monitoring station 102 is implemented at a point of entry and/or is incorporated in a check point station at the point of entry. The security monitoring system may be centrally located at the venue of the event and/or remotely located away from the check point stations 106.

The security central monitoring station 102 includes a rolling code generating module 110. The mobile access device 104A includes an access module 112 and a memory 114 that stores the codes 108. In the example shown, the check point station 106A is at a point of entry and includes a verification module 116. In an embodiment, the access module 112 and the verification module 116 operate as rolling code generating modules. The rolling code generating modules select, generate and/or determine next access codes of a ticket. Each of the rolling code generating modules may be signaled and/or triggered to provide a next access code and may provide that code independent of the other rolling code generating modules as further described below. In another embodiment, the rolling code generating module 110 generates a next access code and provides the access code to the access module 112 and the verification module 116.

The access module 112 may store the next (or updated) access code as one of the codes 108 or replace one of the codes 108 with the updated access code. When the mobile access device 104A is presented on the day of the event at the check point station 106A, the verification module 116 verifies the codes provided by the mobile access device against updated stored codes to determine if the mobile access device and corresponding user are authorized to enter (i.e. gain access to the event). If access is granted, the verification module 116 may, for example, unlock an entry device as further described below to allow the user of the mobile access device to enter the corresponding facility, stadium, vehicle, pavilion, arena, hall, etc. of the event. The rolling code generating module 110 may be implemented at one of the check point stations 106.

Table 1 refers to a few example update methods that may be implemented by the security central monitoring station 102 and devices 104, 106. Although three methods are listed including a time-based method, a geographical location-based method, and an appending method, other methods may be implemented and are described below. For example, a combination of the time-based, geographical location-based and appending methods may be implemented. The time-based method includes the rolling code generating module 110 and/or other rolling code generating modules periodically, pseudo-randomly, or randomly providing an updated access code and/or initiating changing of a current access code of a ticket to an event. This time-based approach may be based on time since the ticket was initially purchased, time since the mobile access device arrived at or is within a predetermined distance of the venue, time until the event starts, etc. In one embodiment, the access code is updated multiple times prior to the ticket being validated and the user and mobile access device gaining access to the event.

In one embodiment, a new access code is transmitted from the security central monitoring station 102 to the mobile access device 104A. In another embodiment, the security central monitoring station 102 signals the mobile access device 104A to use a next predetermined access code previously stored at the security central monitoring station 102 and the mobile access device 104A, for example, when the ticket was initially purchased. When the ticket is initially purchased, multiple access codes may be provided and/or generated and stored in the mobile access device 104A. These access codes are, at the time of purchase, known to the mobile access device 104A and the security central monitoring station 102 and may also be known to one or more of the check point stations 106. These codes may also be provided and/or generated at one or more of the check point stations 106. The check point stations 106 may also be updated when the mobile access device 104A is updated. The updates may include the security central monitoring station 102 signaling the mobile access device 104A and the check point stations 106 with the updated access code or signaling the mobile access device 104A and the check point stations 106 to update the access code with a next stored access code. Other techniques for generating the next access codes are describe below.

TABLE 1

Example Access Code Update Methods

| | | | | Event | | | |
|---|---|---|---|---|---|---|---|
| | | | 1 Purchase Ticket | 2 Ticket ID Generated | 3 Ticket ID Matched to Mobile Access Device | 4 Crossing Threshold | 5 Granting Access (What Access Code is being Checked) |
| Method of Identity Verification | | | | | | | |
| Currently | | Physical/Digital Ticket | — | A | A | A | A |
| UWB or Other Suitable | Method 1 | Time-Based Updates | — | A | A | B . . . C . . . D . . . | D |
| Wireless Communication Frequency | Method 2 | Geographical Location-Based Updates | — | A | A | B . . . C . . . | C |

TABLE 1-continued

Example Access Code Update Methods

| | | | Event | | | |
|---|---|---|---|---|---|---|
| | | 1<br>Purchase<br>Ticket | 2<br>Ticket ID<br>Generated | 3<br>Ticket ID<br>Matched to<br>Mobile Access<br>Device | 4<br>Crossing<br>Threshold | 5<br>Granting<br>Access (What<br>Access Code<br>is being Checked) |
| Range | Method Appended Updates 3 | — | A | A | AB | AB |

Table 1 provides examples of the time-based, geographical location-based, and appending methods as compared to a traditional approach. Table 1 shows that for a traditional ticket purchase and access method a same access code A is provided at purchase of the ticket and is maintained and used to access the event. For the time-based approach, the access code is replaced multiple times prior to gaining access to the event based on when predetermined time thresholds have been exceeded. As shown, the access code is changed from A to B, then to C and then to D. The access code may be changed any number of times prior to gaining access to the event.

The location-based method includes the rolling code generating module 110 updating and/or initiating changing of the access code based on geographical location of the mobile access device 104A. The rolling code generating module 110 may monitor the location of the mobile access device 104A, for example, on the day of the event and/or a predetermined period prior to the event starting. When the mobile access device 104A arrives at and/or passes predetermined check point locations (referred to as "geographical threshold locations") and or is within predetermined distances of a point of entry, the rolling code generating module 110 may provide a new access code and/or initiate updating of a current access code.

In one embodiment, the new access code for the geographical location-based method may also be transmitted from the security central monitoring station 102 to the mobile access device. In another embodiment, the security central monitoring station 102 signals the mobile access device to use a next predetermined access code previously stored at the security central monitoring station 102 and the mobile access device 104A, for example, when the ticket was initially purchased. When the ticket is initially purchased, multiple access codes may be provided and/or generated and stored in the mobile access device and changed when the mobile access device is physically at certain locations. These access codes are, at the time of purchase, known to the mobile access device 104A and the security central monitoring station 102 and may be known to one or more of the check point stations 106. These codes may also be provided and/or generated at one or more of the check point stations 106. The check point stations 106 may also be updated when the mobile access device 104A is updated. The updates may include the security central monitoring station 102 signaling the mobile access device 104A and the check point stations 106 with the updated access code or the signaling the mobile access device 104A and the check point stations 106 to update the access code with a next stored access code.

The appending method includes the rolling code generating module 110 updating and/or initiating changing of a current access code by appending a new access code to at least a portion of the current access code. The appending process may occur multiple times. This may be time-based and/or geographical location-based as described above. Table 1 shows for the geographical location-based and the appending methods the access code is replaced or updated multiple times prior to gaining access to the event. For the geographical location-based approach, the access code is changed from A to B, then to C. For the appending approach, the access code is changed from A to AB, where B was appended to A. The access code may be changed for both of these methods any number of times prior to gaining access to the event.

Figure 2:
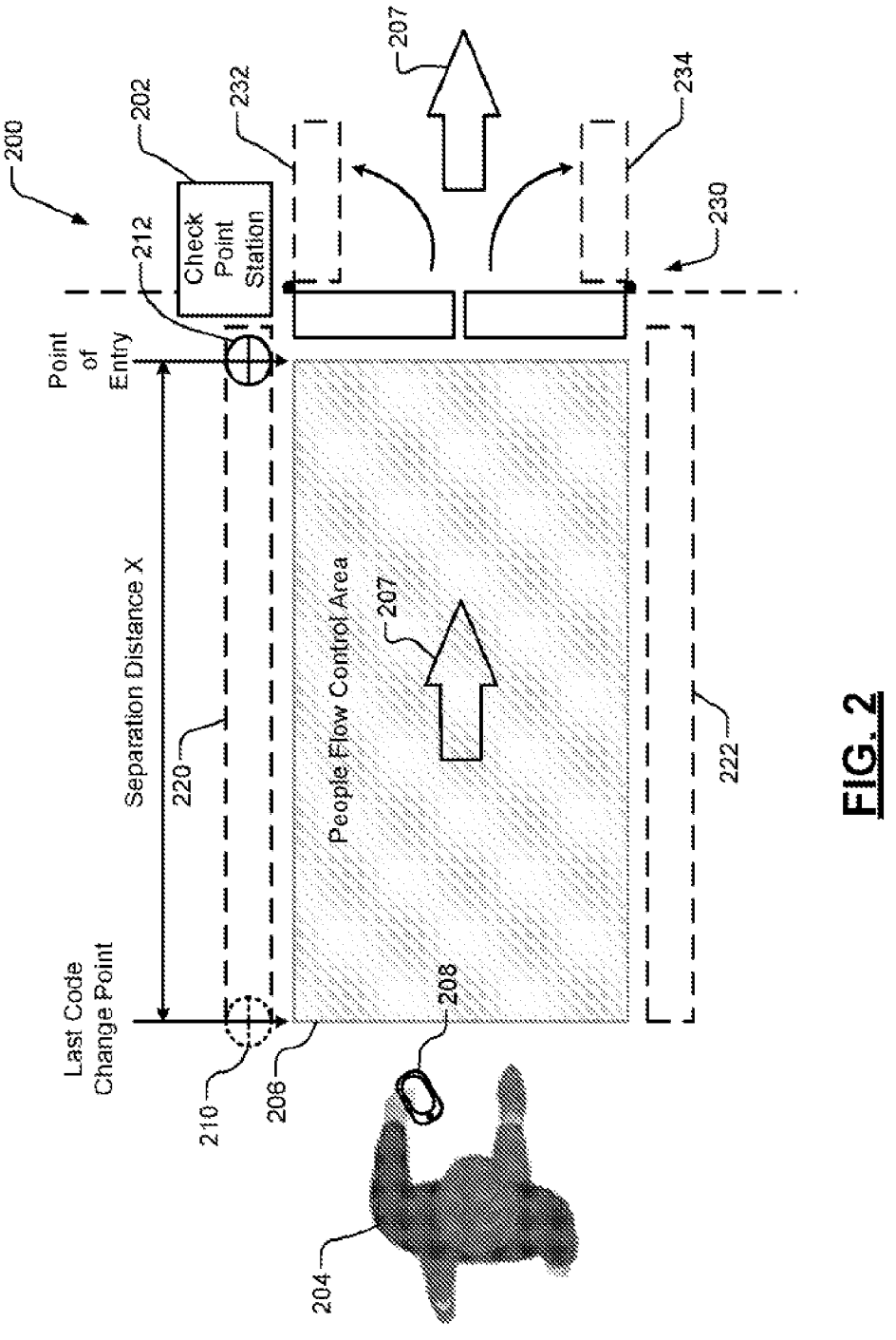
FIG. 2 is an overhead view of an example check point location including a check point station and illustrating threshold code updating and point of access entry based on a separation distance in accordance with the present disclosure.

In one embodiment, the access code is changed when the mobile access device is within a predetermined distance of a point of entry. This further minimizes the chances of an attacker copying the access code and using the access code prior to the ticket holder. An example of this is illustrated by FIG. 2, which shows an example check point location 200 including a check point station 202 and illustrating threshold code updating and point of access entry based on a predetermined separation distance. A ticket holder (or ticket owner) 204 may be in line and walking through a people flow control area 206 in the direction of arrows 207 and holding a mobile access device 208. The check point station 202 and the mobile access device 208 may represent the check point station 106A and the mobile access device 104A of FIG. 1. The mobile access device 208 has stored a current access code for a ticket to gain permitted entry for an event. The ticket holder 204 while walking through the flow control area 206 passes a separation distance point (or last code change point) 210 that is a predetermined separation distance X from the point of entry 212. In one embodiment, the separation distance X is minimized, such that the last access code update occurs in time just prior to the mobile access device arriving at the check point station 202. As an example, the separation distance may be less than or equal to 10 feet (ft). As another example, the separation distance may be less than 2 ft. Movement of the mobile access device 208 may be monitored and when the mobile access device 208 is moving and within a predetermined range of the check point station 202, the mobile access device 208 may be signaled to update the access code as described herein. The triggering to update the access code may be received from the security central monitoring station 102 of FIG. 1 or the check point station 202.

In another embodiment, the mobile access device 208 performs a "self-trigger" event in which a control module (e.g., control module 400 of FIG. 4) of the mobile access device 208 monitors time since the ticket was purchased and signals the security central monitoring station 102 to perform an access code update. As another example, the control module may determine distances between the mobile access device 208 and one or more predetermined reference points at the venue and when the mobile access device 208 is within predetermined ranges of the predetermined reference points, the control module may signal the security central monitoring station 102 to perform an access code update. The predetermined reference points, which may refer to GPS coordinates, may be determined when the corresponding ticket is purchased and provided by the security central monitoring station 102 to the mobile access device 208.

The check point station 202 may operate a gated entryway 230. Dashed rectangles 220, 222 may represent barriers guiding attendees to the event and the gated entryway 230. The gated entryway 230 may include, for example, a turnstile, one or more gates, bars, etc. In the example shown, the gated entryway 230 include two gates 232, 234 that pivot in opposite direction to open a pathway for the ticket holder 204 to pass.

When the mobile access device 208 is at and/or passes the last code change point 210, the current access code is updated a last time prior to being checked by the check point station 202. An access code for the ticket holder is also updated at the check point station 202. The updates may be based on the geographical location and/or detected location of the mobile access device 208 and may include replacement of, appending of and/or a combination thereof the current access code. A portion of the current access code may be replaced or the whole current access code may be replaced. In one embodiment, an updated access code is appended to at least a portion of the current access code. The ticket holder 204 shows the updated access code (e.g., encrypted QR code) to a scanner of the check point station 202. The check point station 202 scans the updated access code and if there is a match, opens the gated entryway 230 to allow the ticket holder 204 to pass. If there is not a match, the gated entryway 230 remains closed. A closed state of the gates 232, 234 is shown by solid line boxes. An open state of the gates 232, 234 is shown by dashed line boxes.

When the mobile access devices 104 are within predetermined ranges of the security central monitoring station 102, and the mobile access devices 104 and the security central monitoring station 102 may communicate wirelessly using, for example, ultra-wide band (UWB) frequencies (e.g., 3.1-10.6 giga-Hertz (GHz)), the Bluetooth® low energy (BLE) frequency 2.4 GHz, wireless fidelity (Wi-Fi®) frequencies, or other suitable radio frequency (RF) frequencies. As an example, the UWB signals may be spread over a large bandwidth of greater than 500 Mega-Hertz (MHz). The BLE and/or UWB signals may be transmitted to and/or received from the mobile access devices 104 and used to connect with and track a location and movement of the mobile access devices 104. When the mobile access devices 104 are outside of the predetermined ranges, the security central monitoring station 102 may communicate with the mobile access devices 104 via cellular frequencies, the Internet, and/or other forms of communication. This communication may be over a distributed network. The security central monitoring station 102 may communicate with the check point stations 106 using wired or wireless communication.

These and other examples are further described below.

Figure 3:
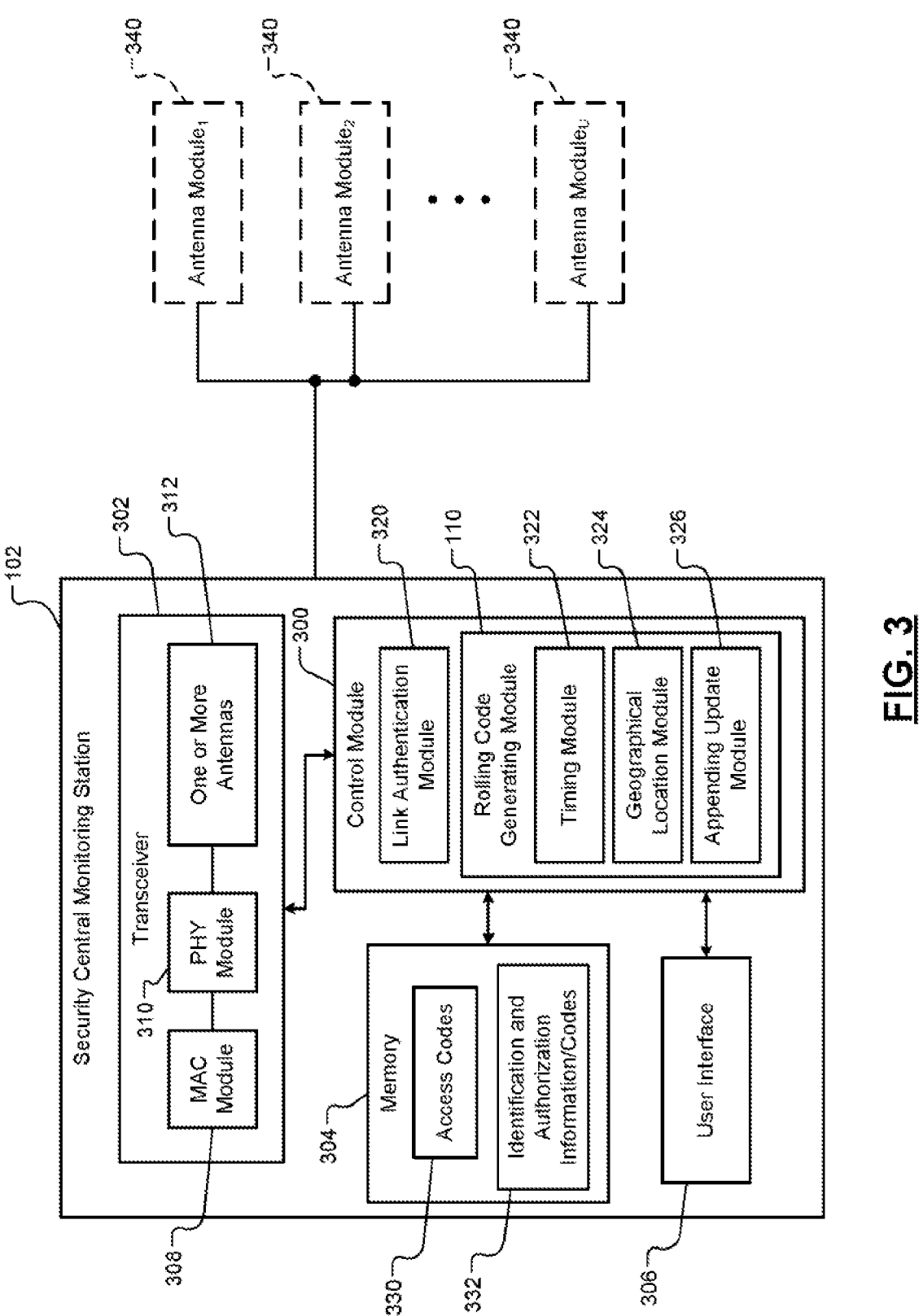
FIG. 3 is a functional block diagram of an example of a security central monitoring station in accordance with the present disclosure.

FIG. 3 shows the security central monitoring station 102 that includes a control module 300, a transceiver 302, a memory 304 and a user interface 306. The transceiver 302 may include a medium access control (MAC) module 308, a physical layer (PHY) module 310 and one or more antennas 312. The control module 300 may execute a link authentication module 320 and the rolling code generating module 110, which may include a timing module 322, a geographical location module 324, and/or an appending update module 326.

The link authentication module 320 may authenticate mobile access devices 104 of FIG. 1 and establish secure communication links. For example, the link authentication module 320 may be configured to implement challenge-response authentication or other cryptographic verification algorithms in order to authenticate the mobile access devices. This authentication may be based on the identification and authorization information and/or associated codes. This information may include any of the user identification, mobile access device identification and/or authorization information referred to herein.

The rolling code generating module 110 may operate in a time-based mode, a location-based mode, an appending mode, or any combination thereof. The timing module 322 implements the time-based method and performs operations to update access codes based on time as disclosed herein. The geographical location module 324 implements the location-based method to update access codes based on location of mobile access devices relative to points of entry and/or check point locations. Each check point location may or may not have a gate through which to pass, a metal detector, a code scanner, and/or other security related detector and/or scanner. One or more of the check point locations may simply refer to predetermined locations, such as a parking lot, a parking structure, a walkway, a set of doors, a stairway, an elevator, a stairwell, a gated entrance, a hallway, a tunnel, and/or other locations of a venue. The appending update module 326 implements the appending method to update access codes by having new access codes appended to previous access codes.

The memory 304 stores access codes 330 and identification and authorization information 332. The access codes 330 include encrypted codes of tickets. The identification and authorization information 332 may include user identifiers (IDs), mobile access device IDs, user personal information including account numbers, home addresses, phone numbers, usernames, passwords, etc. At least some of the identification and authorization information 332 may be encrypted to provide identification and authorization information codes, which may also be stored in the memory 304. The memory 304 may include a non-transitory computer-readable medium including read-only memory (ROM) and/or or random-access memory (RAM). The user interface 306 may include, for example, a display, a touchscreen, a microphone, a keyboard, a touch pad, etc.

In one embodiment, the security central monitoring station 102 transmits signals to, receives signals from, is connected to, and/or wirelessly communicates with antenna modules 340. The antenna modules 340 may be located at various locations in a facility and used to communicate with and/or monitor locations of mobile access devices. The antenna modules 340 may transmit and receive high-frequency RF signals and may include RF and/or UWB antennas. The antenna modules 340 may communicate according to Bluetooth®, UWB and/or Wi-Fi® protocols. Each of the antenna modules 340 may include a RF, BLE and/or UWB antenna and may include a control module and/or other circuitry for RF, BLE and/or UWB signal transmission.

Operation of the security central monitoring station is further described below with respect to FIG. 6.

Figure 4:
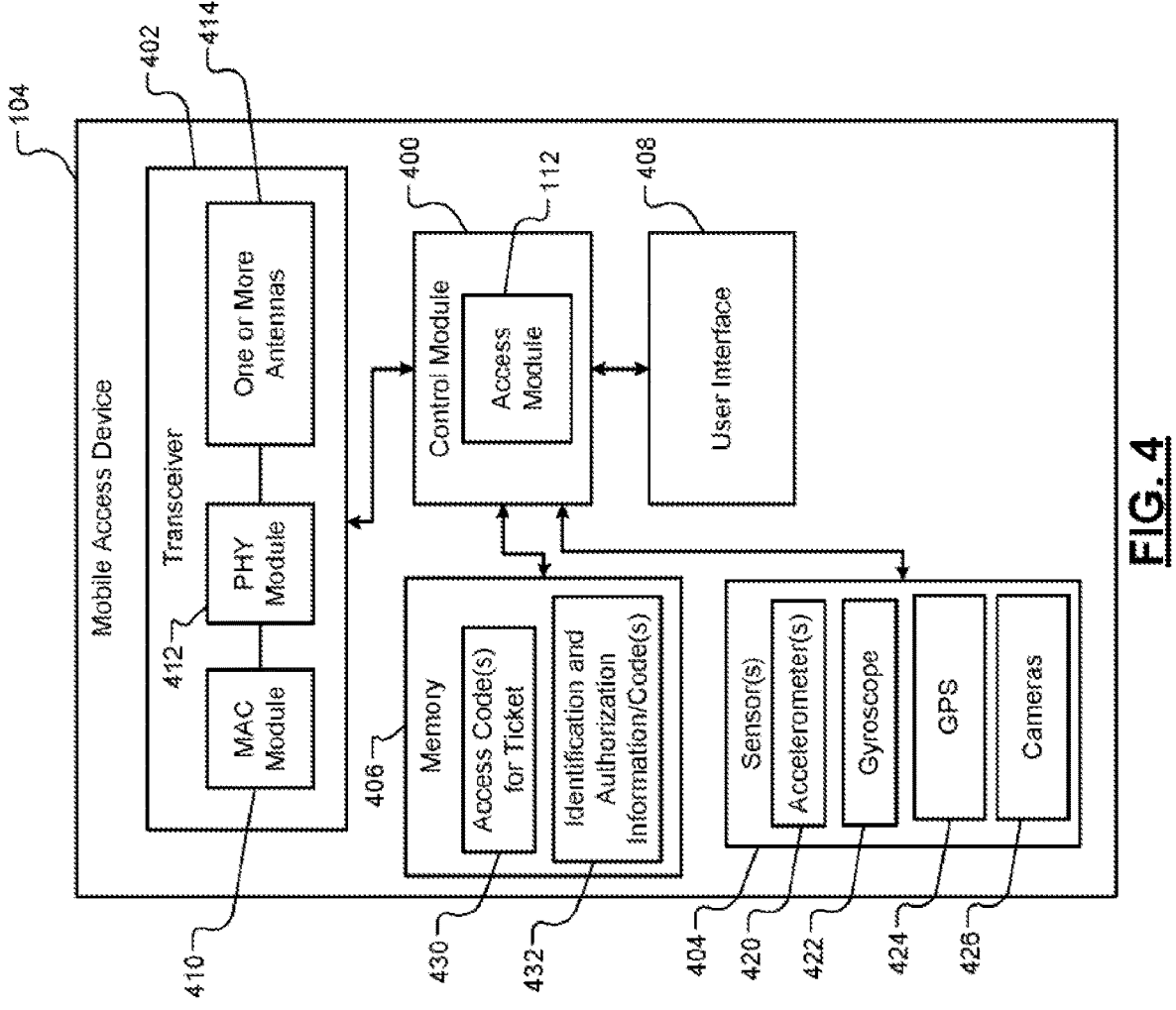
FIG. 4 is a functional block diagram of a mobile access device in accordance with the present disclosure.

FIG. 4 shows an example of any of the mobile access devices 104 of FIG. 1. The mobile access devices 104 may include cellular phones, wearable devices, tablets, laptop computers, and/or other portable network devices. The mobile access devices 104 may be, for example, a Bluetooth®-enabled and UWB-enabled communication device, such as a smart phone, smart watch, wearable electronic device, key fob, tablet device, or other device associated with a user. The user may be an owner and/or authorized user of the mobile access device.

The mobile access device 104 may include a control module 400, a transceiver 402, sensors 404, a memory 406, and a user interface 408. The transceiver 402 may include a MAC module 410, a PHY module 412 and one or more antennas 414.

The control module 400 controls operation of the mobile access device 104. In one embodiment, the control module 400 includes or is part of a BLE and/or UWB communication chipset. Alternatively, the control module 400 may include or be part of a Wi-Fi or Wi-Fi direct communication chipset.

The control module 400 includes the access module 112, also shown in FIG. 1, and communicates with the control module 300 of the security central monitoring station 102 and the check point stations 106 and performs access code updating operations identification operations, authentication operations, access operations and other operations as further described herein. The access module 112 may perform a signal exchange with the control module 300 of FIG. 2 and/or the verification module 116 of FIG. 1 to allow the control module 300 and/or the verification module 116 to determine a location of the mobile access device 104 relative to points of entry and/or check point stations. This may include the control module 400 of the mobile access device 104 exchanging signals with the security central monitoring station 102 and/or one or more of the check point stations 106 to determine distances between the mobile access device 104 and points of entry and/or check points, some of which may be at the check point stations 106.

The control module 400, although not shown in FIG. 4, may include and/or perform operations of a rolling code generating module, a timing module, a geographical location module and/or an appending module similar to the modules 10, 322, 324, and 326 of FIG. 3. The control module 400 may determine next access codes based on time and/or geographical location of the mobile access device 104. This may be based on a signal exchange with the control module 300 or a control module of a check point station. The control module 400 may append access codes as referred to herein.

The location of the mobile access device 104 may be determined using any of the sensors 404. The control module 400 may transmit information regarding the mobile access device 104, such as location, heading and/or velocity information obtained from one or more of the sensors 404 to the security central monitoring station 102 and/or the check point stations 106. In the example shown, the sensors 404 include one or more accelerometers 420, a gyroscope 422, a global position system (GPS) 424, cameras 426, and/or other sensors (e.g., angular rate sensors). Single sided ranging, double sided ranging, time-of-flight determining, round trip time determining, etc. may be performed to determine distances between the mobile access devices 104 and the points of entry and/or the check points.

The memory 406 may store application code that is executable by the control module 400. The memory 406 may store access codes 430 for tickets and identification and authorization information and/or associated codes 432, such as that referred to herein. The memory 406 may include a non-transitory computer-readable medium including read-only memory (ROM) and/or random-access memory (RAM). The user interface 408 may include a microphone, a display, a touchscreen, a touch pad, a keyboard, etc.

Operation of the mobile access device 104 is further described below with respect to FIG. 7.

Figure 5:
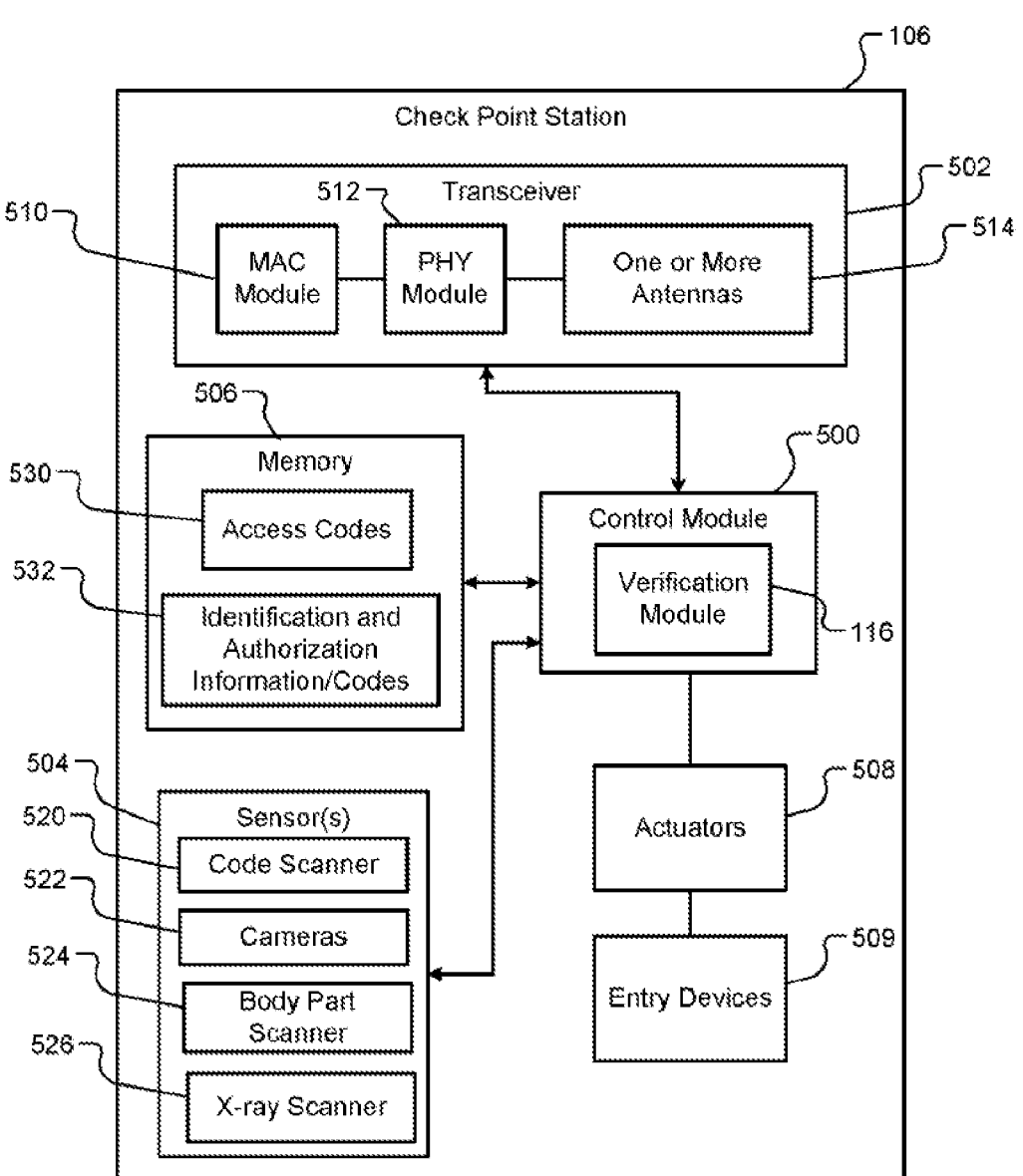
FIG. 5 is a functional block diagram of a check point station in accordance with an embodiment of the present disclosure.

FIG. 5 shows an example of any of the check point stations 106 of FIG. 1. The check point station 106 may include a control module 500, a transceiver 502, sensors 504, a memory 506, actuators 508 and entry devices 509. The transceiver 502 may include a MAC module 510, a PHY module 512 and one or more antennas 514.

The control module 500 controls operation of the check point station 106. In one embodiment, the control module 500 includes or is part of a BLE and/or UWB communication chipset. Alternatively, the control module 500 may include or be part of a Wi-Fi or Wi-Fi direct communication chipset. The control module 500 includes the verification module 116, also shown in FIG. 1, and communicates with the control module 300 of the security central monitoring station 102 and the control module 400 of the mobile access device 104 and performs access code updating operations identification operations, authentication operations, access operations and other verification operations as further described herein. The control module 500 may share information regarding the mobile access device 104 with the security central monitoring station 102 and vice versa. The control module 500, although not shown in FIG. 5, may include and/or perform operations of a rolling code generating module, a timing module, a geographical location module and/or an appending module similar to the modules 10, 322, 324, and 326 of FIG. 3. The control module 500 may perform similarly as the control module 300.

At least some of the verification operations may be performed using the sensors 504, which may include a code scanner 520, one or more cameras 522, a body part scanner 524, an x-ray scanner 526 and/or other sensors. The code scanner 520 may scan a code (e.g., a bar code, a QR code, or other encrypted code) showing on a display of the mobile access device 104. The cameras 522 may be used to capture an image of the code. The cameras may also be used to capture images of a ticket holder. The body part scanner 524 may be used to, for example, scan a finger (for fingerprint detection), an eye, and/or other body part of the ticket holder. The x-ray scanner 526 may scan people, bags and/or other gear to detect unpermitted objects. These scans may be performed at a point of entry to gather codes as well as identification and/or mobile access device identification information. Additionally or as an alternative, the control module 500 may wirelessly receive identification and/or authorization information and/or codes from the mobile access device 104.

The memory 506 may store application code that is executable by the control module 500. The memory 506 may store access codes 530 for tickets and identification and authorization information and/or associated codes 532, such as that referred to herein. The memory 506 may include a non-transitory computer-readable medium including read-only memory (ROM) and/or random-access memory (RAM).

The actuators 508 may be, for example, motors and have corresponding links, connecting members, gears, rollers, etc. for unlocking and/or moving the entry devices 509. The entry devices 509 may include one or more locks, gates, hinges, bars, doors, etc. As an example, the entry device 509 may include the gates 232, 234 of FIG. 2 and the actuators 508 may include motors for unlocking and/or pivoting the gates 232, 234.

Operation of the check point station 106 is further described below with respect to FIG. 8.

The control modules 300 and 500 and/or the antenna modules 340 of the stations 102 and 106 may measure a received signal strength of a signal received from the mobile access device 104 and generate a corresponding RSSI value. Additionally or alternatively, the control modules 300 and 500 and/or the antenna modules 340 may take other measurements of transmitted and received signals from the mobile access device 104, such as an angle of arrival, a time of flight, a time of arrival, a time difference of arrival, etc. As an example, time of flight calculations may be made to measure time of flight of UWB signals. The control modules 300 and 500 and/or the antenna modules 340, based on the measured information, may then determine (i) a location of the mobile access device 104 relative to one or more points of entry and/or one or more check points, and/or (ii) distances between the mobile access device 104 and one or more points of entry and/or one or more check points. This information may be shared with the control modules 300, 500 and/or other station control modules.

The location and distance determinations may be based on similar information received from one or more of the antenna modules 340 of FIG. 3 and/or other sensors. As an example, the control modules 300 and 500 and/or the antenna modules 340 may determine the location of the mobile access device 104 based on, for example, patterns of received signal strength indicator (RSSI) values corresponding to signals received from the mobile access device 104 by the antenna modules 340. A strong (or high) RSSI value indicates that the mobile access device 104 is close to a certain point (or location) of interest and a weak (or low) RSSI value indicates that the mobile access device 104 is further away from the point of interest. By analyzing the RSSI values, the control modules 300 and 500 and/or the antenna modules 340 may determine a location of and/or a distance to the mobile access device relative to the point of interest. Additionally or alternatively, angle of arrival, angle of departure, round trip timing, unmodulated carrier tone exchange, or time difference of arrival measurements for the signals sent between the mobile access device and the control modules 300 and 500 may also be used by the control modules 300 and 500 or the mobile access device 104 to determine the location of the mobile access device 104. The antenna modules 340 may determine the location of and/or distance to the mobile access device 104 based on the measured information and communicate the location or distance to the control modules 300 and 500. Based on the determined location of or distance to the mobile access device 104 relative to the point of interest, the control modules 300 and 500 may then authorize and/or perform an action, such as permitting passage through an entryway.

Figure 6:
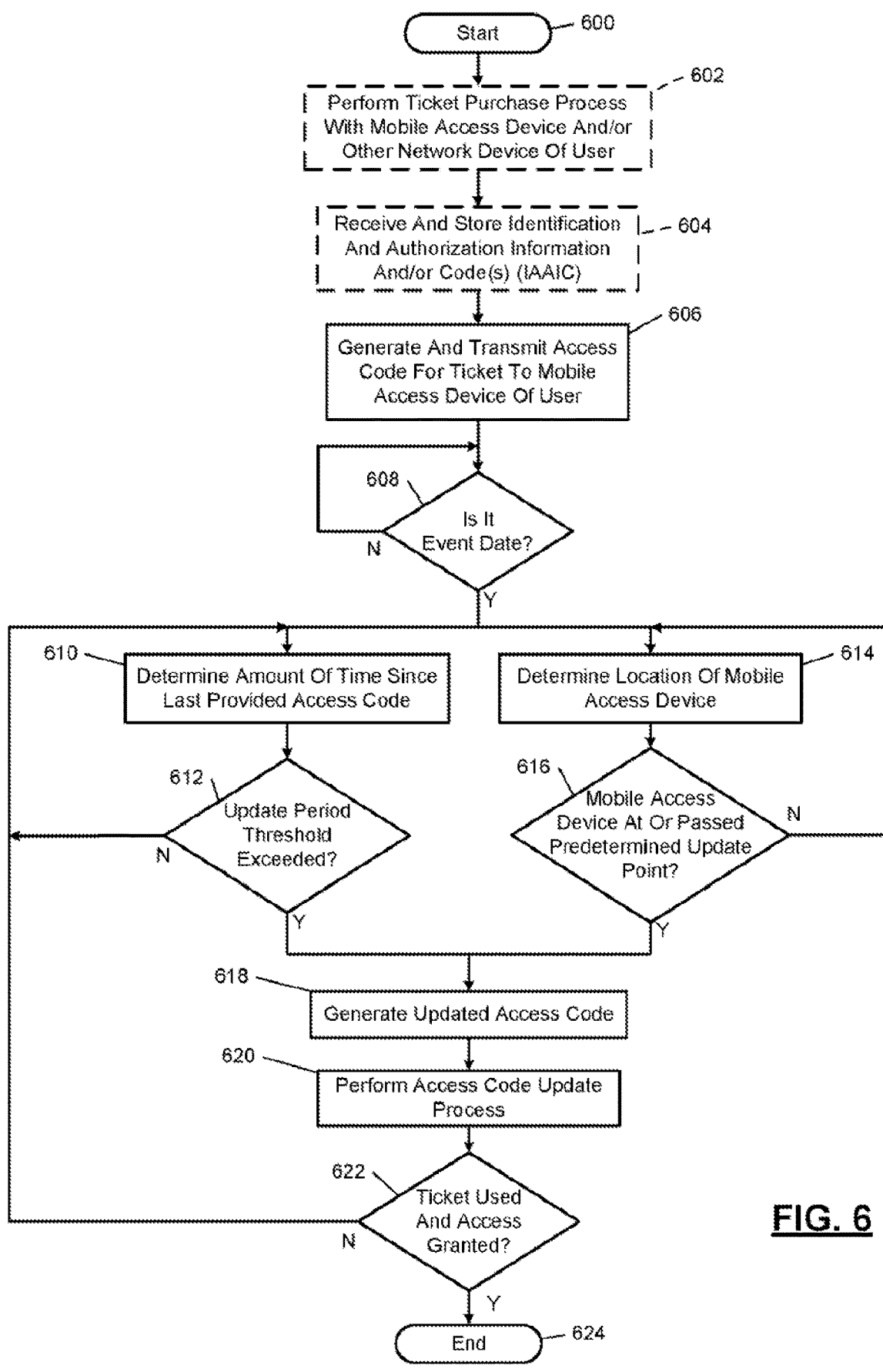
FIG. 6 illustrates a method of operating a security central monitoring station in accordance with an embodiment of the present disclosure.

FIG. 6 illustrates a method of operating a security central monitoring station. Although the following operations of FIGS. 6-8 are primarily described with respect to the implementations of FIGS. 1-5, the operations may be easily modified to apply to other implementations of the present disclosure. The operations may be iteratively performed. The method of FIG. 6 may be performed while the methods of FIGS. 7-8 are being performed. The operations of FIG. 6 may be performed by a control module and/or range module of the mobile access device.

The method may begin at 600. At 602, the control module 300 of the security central monitoring station 102 may perform a ticket purchase process with a network device of a purchaser of a ticket. This process may be performed by the security central monitoring station 102 and/or by a different station. The network device of the purchaser may be the mobile access device 104 of FIG. 4 or other network device. Any information collected during the ticket purchase process, such as purchaser identification information, ticket holder information, network device identification information, address of purchaser and/or ticket holder, credit card information of purchaser, usernames of purchaser and/or ticket holder, passwords of purchaser and/or ticket holder, etc. may be provided to the control module 300. The purchaser and the ticket holder may be the same person or a different people.

At 604, the control module 300 of the security central monitoring station 102 may receive identification and authorization information, such as any of the user identification, mobile access device identification and/or authorization information referred to herein. Operation 604 may be performed in addition to or alternatively from performing operation 602. The identification and authorization information may be provided by the mobile access device 104 or other network device to the security central monitoring station 102. The ticket holder may purchase the ticket using the mobile access device 104 or another network device and download the ticket (i.e. an access code associated with the ticket) to the mobile access device 104.

At 606, the control module 300 may generate, receive and/or store the initial access code of the ticket. In one embodiment, the control module 300 receives a set of access codes associated with the ticket and identifies the first one of the access codes as the current access code. The other access codes may be arranged in a predetermined order and/or may be accessed when determining a next access code. The access codes may be selected in the predetermined order or using a predetermined algorithm, which may be shared with the control module 300, the control module 400 of the mobile access device 104 and/or the control modules (e.g., the control module 500) of one or more check point stations.

At 608, the control module 300 determines if a current date is the date of the event of the ticket purchased. If yes, operation 610 and/or 614 are performed. In another embodiment, time-based updates of the access code are made prior to the event date.

The following operations 610, 612 may be performed while performing operations 614, 616. At 610, the timing module 322 determines an amount of time past since the initial access code for the ticket was generated and/or an amount of time since a last update of the access code. At 612, if the amount of time past since the initial access code was generated is greater than or equal to a first predetermined amount and/or the amount of time since the last update is greater than or equal to a second predetermined amount, then operation 618 is performed, otherwise operation 610 may be performed. At 618, the control module 300 generates an updated access code for the ticket.

At 614, the geographical location module 324 determines a location of the mobile access device 104 relative to one or more points of access and/or check points. This may include the geographical location module 324 determining the location of the mobile access device 104 as described above and/or one or more of the antenna modules 340, the mobile access device 104 and/or one or more check point stations 106 determining and reporting the location of the mobile access device 104 to the geographical location module 324.

At 616, the geographical location module 324 determines whether the mobile access device 104 has reached and/or passed one or more check points and/or is within a separation distance X of a point of entry. If yes, operation 618 is performed, otherwise operation 614 may be performed. If both 612 and 616 are true within a predetermined period of each other, then operation 618 may be performed once, as opposed to being performed twice (once for 612 and once for 616).

At 618, the rolling code generating module 110 may initiate generation of an updated access code for the ticket. This may include generating a replacement code, determining a next access code, and/or establishing a link with the mobile access device 104 to have the access code updated.

At 620, the control module 300 performs an access code update process. This may include the control module 300 performing a signal exchange with the mobile access device 104 to verify identification and authorization information and/or codes (IAAIAC) to make sure that the mobile access device 104 is authorized to have the updated code and/or is performing the update. Assuring that the mobile access device 104 performs the update, assures that the updated access code of the control modules 300 is the same updated access code of the control module 400. If authorized and/or performing the update, the rolling code generating module 110 may update the current access code based on the replacement code and/or the next access code. The rolling code generating module 110 may signal the mobile access device 104 to update the current access code and, in response thereto, the mobile access device 104 may then (i) update the current access code independent of the rolling code generating module 110 generating an updated access code, (ii) replace the current access code with the updated access code, and/or (iii) append an updated access code to at least a portion of the current access code. The mobile access device 104 may update the current access code based on a signal and/or code received from the rolling code generating module 110. The code received from the rolling code generating module 110 may be the replacement code or updated code determined by the rolling code generating module 110. The rolling code generating module 110 and the control module 400 may exchange signals to make sure that the modules 110 and 400 are on a same access code when independently updating the access code. The signals may not include the codes, but rather an indication of what codes were generated and/or selected. The rolling code generating module 110 may similarly signal the control module 500 of the check point station 106 and/or other check point stations to update the access codes stored in the check point stations. The signal may include the updated access codes or an indicator to update the access code.

In one embodiment, when the ticket holder passes through a point of entry for an event multiple times due to the ticket holder leaving the corresponding facility one or more times, the control modules 300, 400, 500 create different appended access codes each time the ticket holder returns. For example, the control modules 300, 400, 500 may append a first access code B to a current access code A prior to the ticket holder passing through the point of entry of the facility a first time for an event to generate a first updated access code AB and then, after the ticket holder leaves the facility and returns to the facility for the same event, appends (i) a second access code C to the first updated access code AB to generate a second updated access code (e.g., ABC), or (ii) the second access code C to a portion of the first updated access code AB to generate a second updated access code (e.g., AC or BC).

At 622, the control module 300 may determine if the ticket has been used and access has been granted. If yes, the method may end at 624, otherwise operations 610 and/or 614 may be performed. When the ticket holder leaves, for example, the facility of the event and returns for the same event and reenters the facility, the control module may return to operations 610 and/or 614.

Figure 7:
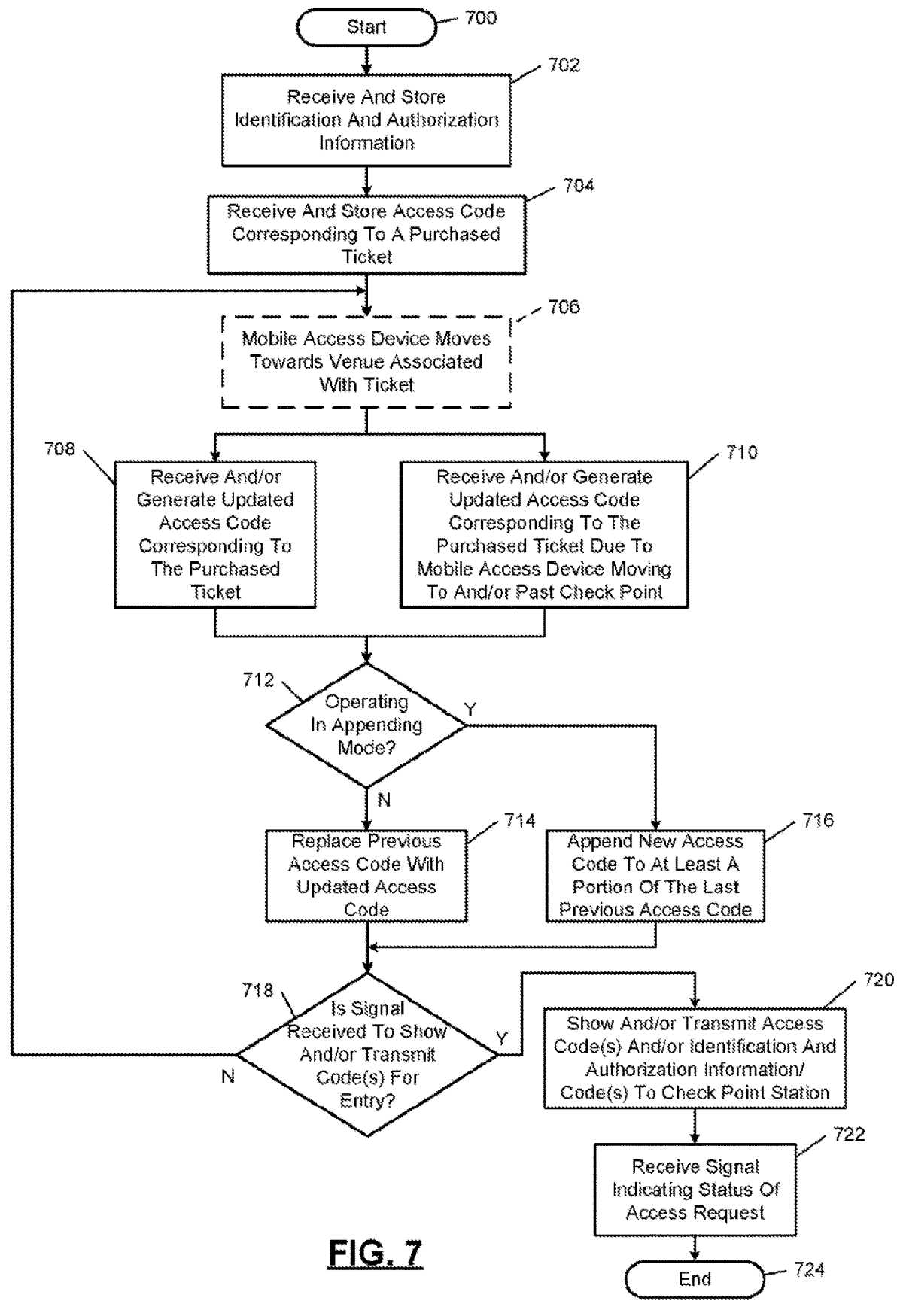
FIG. 7 illustrates a method of operating a mobile access device in accordance with an embodiment of the present disclosure.

FIG. 7 shows a method of operating the mobile access device 104. The method may begin at 700. At 702, the control module 400 of the mobile access device 104 may receive and store identification and authorization information in the memory 406. At 704, the control module 400 receives and stores an access code corresponding to a purchased ticket. The ticket purchaser may purchase the ticket using the mobile access device 104 or other network device. The ticket include the access code may be downloaded to the mobile access device 104. The ticket may be purchased, for example, via the Internet. Other information may also be downloaded to the mobile access device, such as the address of the venue, a receipt for the purchase, predetermined reference points for self-triggering access code updates, etc. If the mobile access device 104 is to perform a rolling code operation, a set of access codes may be downloaded and instructions for accessing and/or selecting a next access code. The instructions may include an order of the access codes to follow for selection, an algorithm for selecting the next access code, one or more equations, etc.

At 706, the mobile access device 104 is moved closer to the venue, facility, and/or vehicle of the event associated with the ticket.

At 708, the access module 112 operates in the time-based mode and may receive signals from the control module 300 or the control module 500 to confirm IAAIAC and initiate updating of the access code due to a predetermined amount of passage of time since the ticket was purchased and/or a predetermined amount of time since a last update of the access code occurred. The signals may include an updated access code or simply an indicator for the control module 400 to update the access code.

At 710, the access module 112 operates in the location-based mode and may receive signals from the control module 300 or the control module 500 to confirm IAAIC and initiate updating of the access code due to the mobile access device 104 being located at and/or passing a check point location. The signal may include an updated access code or simply an indicator for the control module 400 to update the access code.

At 712, the access module 112 determines whether it is operating in the appending mode. If operating in the appending mode, operation 716 is performed, otherwise operation 714 is performed.

At 714, the access module 112 replaces the current (or previous) access code with an updated access code. The updated access code may be accessed from the memory 406, received from the control module 300 or the control module 500, or generated by the access module 112 based on a predetermined algorithm. Each of the control modules 300, 400, 500 may store the same algorithm for generating the next access code.

At 716, the access module 112 appends a new access code to at least a portion of the last previous access code. This may include accessing the new access code from the memory 406, receiving the new access code from the control module 300 or the control module 500, or generating the new access code based on the predetermined algorithm.

At 718, the access module 112 may determine whether a signal has been received to show and/or transmit codes for entry. This may occur, for example, when the mobile access device 104 is at a point of entry and is providing the codes to a check point station to gain permitted entry for the event. As an example, a ticket holder may provide an input to show the latest access code to a scanner of the check point station. As another example, the ticket holder may provide an input to transmit the codes to the check point station.

At 720, the access module shows and/or transmits the latest access code (or codes) and/or the identification and/or authorization information and/or codes to the check point station. At 722, the access module 112 may receive a signal from the check point station indicating status of access request. For example, the mobile access device may display a phrase "access codes validated—entry permitted" or the phrase "one or more invalid codes received—entry denied". The method may end at 724.

Figure 8:
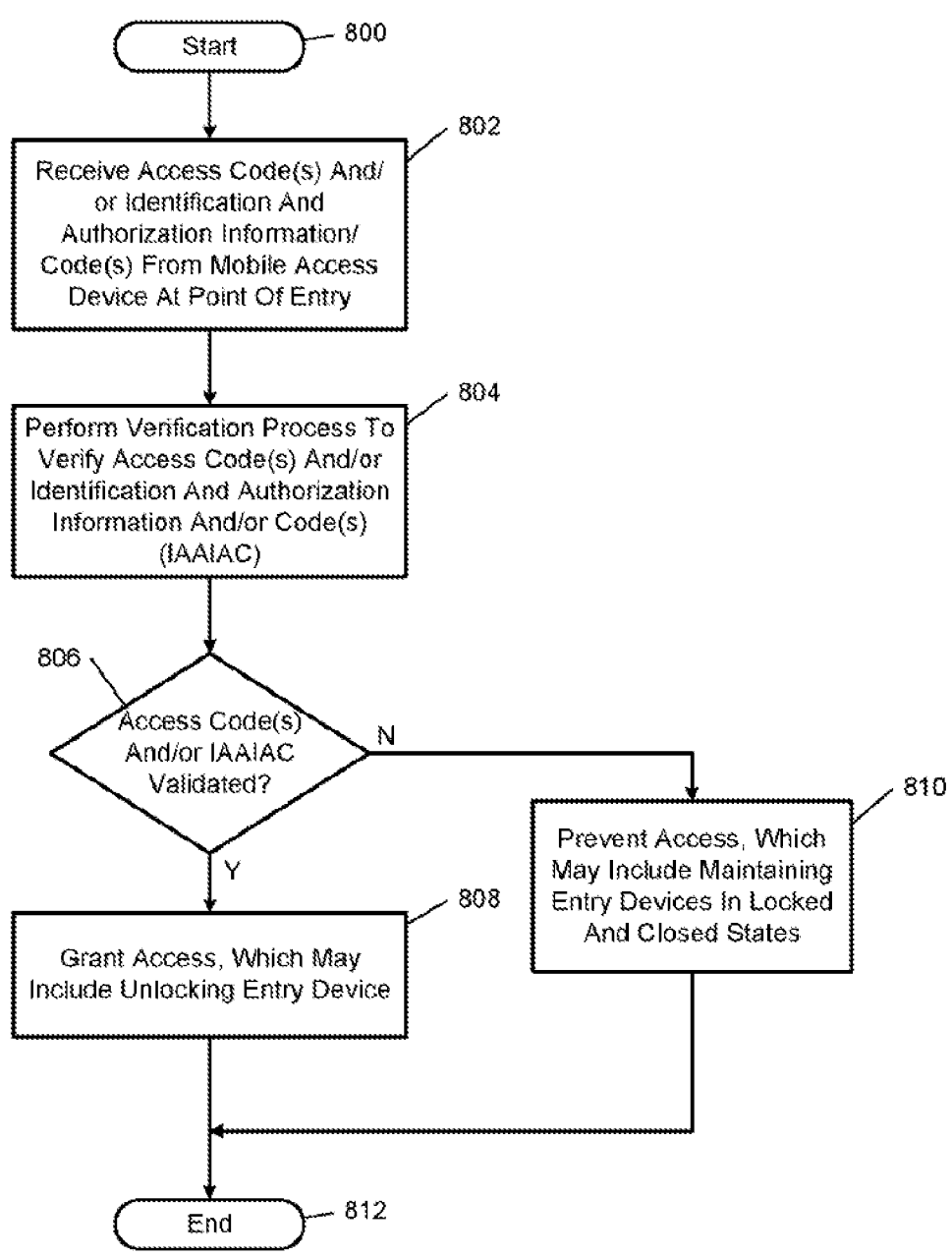
FIG. 8 illustrates a method of operating a check point station in accordance with the present disclosure.

FIG. 8 shows a method of operating a check point station 106 at a point of entry. The method may begin at 800. At 802, the controller 500 of the check point station 106 may receive access codes and/or IAAIAC from the mobile access device 104 at a point of entry.

At 804, the controller 500 may perform a verification process to verify the access codes and the IAAIAC. This may include comparing the codes and/or information to stored codes and/or information to determine if there is a match.

At 806, if the access codes and/or IAAIAC are validated, operation 808 is performed, otherwise operation 810 is performed. At 808, the control module 500 signals the actuators 508 to actuate the entry devices 509 to provide permitted entry as described above. At 810, the control module 500 prevents access, which may include maintaining entry devices in locked and closed states. The method may end at 812.

The above-described operations of FIGS. 6-8 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The examples set forth herein aid in preventing attackers from obtaining access codes for tickets purchased by others. The examples aid in preventing or counteracting cyber attacks which often occur remotely via the Internet. The examples cause ticket credentials to be reissued. For example, a ticket credential may be reissued prior to, at or subsequent to a mobile access device crossing a geographical threshold. The ticket credential may be reissued when a timing threshold has been exceeded. The examples provide the updates close to when the ticket is to be used by the ticket holder resulting in there to not being enough time for an attacker to steal or copy an access code of the ticket before the ticket is used by the ticket holder. Access codes are updated based on time since a ticket was purchased and/or a location of a mobile access device storing the ticket. A rolling code type credential may be generated when the mobile access device is within a predetermined range of a point of entry. An access granting device (e.g., a security central monitoring station, a check point station, and/or other access granting device) may trigger the rolling code generation of a next access code. Any number and/or portions of previously generated access codes may be appended to form a current access code. A combination of the location based and appending approaches prevents an access code (or key) from being duplicated and/or stolen because the granted access is based on a previous key and the key being generated at or near the point of access. The key provided at or near the point of access cannot be stolen since the key is generated very close to the point of access. Put another way, an attacking device that mirrors (copies) the previous key will not get the update at the point of access and as a result will be denied entry.

A system for providing ticket based authorized entry of a mobile access device. The system includes a memory, a transceiver and a control module. The memory is configured to store an access code of a ticket of an event to be accessed by the mobile access device using the ticket. The mobile access device stores the access code. The transceiver is configured to communicate with the mobile access device. The control module is configured to: determine when the ticket was purchased; determine at least one of (i) an amount of time since the ticket was purchased, or (ii) an amount of time since the access code of the ticket was last updated; and updates the access code stored in the memory and signals the mobile access device via the transceiver to update the access code stored at the mobile access device in response to at least one of (i) the amount of time since the ticket was purchased exceeding a first predetermined amount of time, or (ii) the amount of time since the access code of the ticket was last updated exceeding a second predetermined amount of time. Access to the event by the mobile access device and a corresponding ticket holder is based on the updated access code.

In other features, the control module is configured to (i) determine the amount of time since the ticket was purchased, and (ii) update the access code stored in the memory and signal the mobile access device to update the access code stored at the mobile access device in response to the amount of time since the ticket was purchased having exceeded the first predetermined amount of time.

In other features, the control module is configured to (i) determine the amount of time since the access code of the ticket was last updated, and (ii) update the access code stored in the memory and signal the mobile access device to update the access code stored at the mobile access device in response to the amount of time since the access code of the ticket was last updated having exceeded the second predetermined amount of time.

In other features, the control module is configured to periodically, pseudo-randomly or randomly signal the mobile access device to update the access code stored in the memory and signal the mobile access device to update the access code stored at the mobile access device prior to the ticket being used to gain entry to the event.

In other features, the control module is configured to (i) determine a location of the mobile access device, and (ii) signal the mobile access device to update the access code stored in the memory and signal the mobile access device to update the access code stored at the mobile access device when the mobile access device is within a predetermined distance of a point of entry of the event.

In other features, the system is configured to: receive the access code stored at the mobile access device; compare the access code received from the mobile access device to the updated access code; determine whether the received access code from the mobile access device is valid; and in response to determining that the access code received from the mobile access device is valid, actuate an entry device to provide permitted passage to the event for the ticket holder of the mobile access device.

In other features, the control module is configured to, when updating the access code stored in the memory append a new access code to at least a portion of a previous access code.

In other features, a system is provided for ticket based authorized entry of a mobile access device. The system includes a memory, a transceiver and a control module. The memory is configured to store an access code corresponding to a ticket of an event to be accessed by the mobile access device, where the mobile access device stores the access code. The transceiver is configured to communicate with the mobile access device. The control module is configured to: determine a location of the mobile access device relative to a check point location for the event; determine whether the mobile access device is at or closer to a point of entry of the event than the check point location; and in response to the determining that the mobile access device is at or closer to the point of entry than the check point location, update the access code stored in the memory and signal the mobile access device via the transceiver to update the access code stored at the mobile access device. Access to the event by the mobile access device and a corresponding ticket holder is based on the updated access code.

In other features, the control module is configured to iteratively, for each check point passed by the mobile access device, update the access code in the memory and the access code stored at the mobile access device.

In other features, the control module is configured to (i) monitor movement of the mobile access device, and (ii) while the mobile access device is moving and is within a predetermined range of the check point location, update the access code stored in the memory and signal the mobile access device to update the access code stored at the mobile access device.

In other features, the system is configured to: receive the access code stored at the mobile access device; compare the access code received from the mobile access device to the updated access code; determine whether the received access code from the mobile access device is valid; and in response to determining that the access code received from the mobile access device is valid, actuate an entry device to provide permitted passage to the event for the ticket holder of the mobile access device.

In other features, the control module is configured to update the access code stored in the memory based on an amount of time since the ticket was purchased by the ticket holder associated with the mobile access device.

In other features, the control module is configured to, when updating the access code stored in the memory append a new access code to at least a portion of the access code stored in the memory or at least a portion of the updated access code.

In other features, the control module is configured to, when updating the access code stored in the memory append a new access code to at least a portion of the access code stored in the memory or at least a portion of the updated access code.

In other features, a station for providing ticket based authorized entry of a mobile access device is provided. The station includes a memory, a transceiver and a control module. The memory is configured to store an access code of a ticket of an event to be accessed by the mobile access device using the ticket. The mobile access device stores the access code. The transceiver is configured to communicate with the mobile access device. The control module is configured to: determine when the ticket was purchased; determine at least one of (i) an amount of time since the ticket was purchased, or (ii) an amount of time since the access code of the ticket was last updated; and updates the access code stored in the memory and signals the mobile access device via the transceiver to update the access code stored at the mobile access device in response to at least one of (i) the amount of time since the ticket was purchased exceeding a first predetermined amount of time, or (ii) the amount of time since the access code of the ticket was last updated exceeding a second predetermined amount of time. Access to the event by the mobile access device and a corresponding ticket holder is based on the updated access code.

In other features, the control module is configured to (i) determine the amount of time since the ticket was purchased, and (ii) update the access code stored in the memory and signal the mobile access device to update the access code stored at the mobile access device in response to the amount of time since the ticket was purchased having exceeded the first predetermined amount of time.

In other features, the control module is configured to (i) determine the amount of time since the access code of the ticket was last updated, and (ii) update the access code stored in the memory and signal the mobile access device to update the access code stored at the mobile access device in response to the amount of time since the access code of the ticket was last updated having exceeded the second predetermined amount of time.

In other features, the control module is configured to periodically, pseudo-randomly or randomly signal the mobile access device to update the access code stored in the memory and signal the mobile access device to update the access code stored at the mobile access device prior to the ticket being used to gain entry to the event.

In other features, the control module is configured to (i) determine a location of the mobile access device, and (ii) signal the mobile access device to update the access code stored in the memory and signal the mobile access device to update the access code stored at the mobile access device when the mobile access device is within a predetermined distance of a point of entry of the event.

In other features, the station is configured to: receive the access code stored at the mobile access device; compare the access code received from the mobile access device to the updated access code; determine whether the received access code from the mobile access device is valid; and in response to determining that the access code received from the mobile access device is valid, actuate an entry device to provide permitted passage to the event for the ticket holder of the mobile access device.

In other features, the control module is configured to, when updating the access code stored in the memory append a new access code to at least a portion of a previous access code.

In other features, a station for providing ticket based authorized entry of a mobile access device is provided. The station includes a memory, a transceiver and a control module. The memory is configured to store an access code corresponding to a ticket of an event to be accessed by the mobile access device. The mobile access device stores the access code. The transceiver is configured to communicate with the mobile access device. The control module is configured to: determine a location of the mobile access device relative to a check point location for the event; determine whether the mobile access device is at or closer to a point of entry of the event than the check point location; and in response to the determining that the mobile access device is at or closer to the point of entry than the check point location, update the access code stored in the memory and signal the mobile access device via the transceiver to update the access code stored at the mobile access device. Access to the event by the mobile access device and a corresponding ticket holder is based on the updated access code.

In other features, the control module is configured to iteratively, for each check point passed by the mobile access device, update the access code in the memory and the access code stored at the mobile access device.

In other features, the control module is configured to (i) monitor movement of the mobile access device, and (ii) while the mobile access device is moving and is within a predetermined range of the check point location, update the access code stored in the memory and signal the mobile access device to update the access code stored at the mobile access device.

In other features, the station is configured to: receive the access code stored at the mobile access device; compare the access code received from the mobile access device to the updated access code; determine whether the received access code from the mobile access device is valid; and in response to determining that the access code received from the mobile access device is valid, actuate an entry device to provide permitted passage to the event for the ticket holder of the mobile access device.

In other features, the control module is configured to update the access code stored in the memory based on an amount of time since the ticket was purchased by the ticket holder associated with the mobile access device.

In other features, the control module is configured to, when updating the access code stored in the memory append a new access code to at least a portion of the access code stored in the memory or at least a portion of the updated access code.

In other features, A mobile access device is provided and includes a memory, a transceiver and a control module. The memory is configured to store an access code of a ticket for an event. The transceiver is configured to communicate with a first station of the event. The control module is configured to: receive a signal from the first station to update the access code based on time since the ticket was purchased or a location of the mobile access device; update the access code stored in the memory based on the signal; show or transmit the updated access code to the first station or a second station as an access request when the mobile access device is at a point of entry; and receive a signal from the first station or the second station indicating a status of the access request.

In other features, the control module is configured to update the access code stored in the memory without receiving an updated access code from a station.

In other features, the control module is configured to select a next access code in a list of access codes stored in the memory in response to receiving the signal to update the access code.

In other features, the control module is configured to generate the updated access code based on a predetermined algorithm stored in the memory.

In other features, the signal includes an updated access code for the ticket; and the control module replaces the access code stored in the memory with the updated access code included in the signal.

In other features, the control module is configured to append a new access code to at least a portion of the access code stored in the memory when updating the access code stored in the memory.

In other features, the control module is configured to: append a first new access code to the access code stored in the memory to form an updated access code when the mobile access device passes the point of entry a first time; and either (i) append a second new access code to the first new access code and drop a remainder of the updated access code when the mobile access device passes the point of entry a second time, or (ii) append the second new access code to the remainder of the updated access code and drop the first new access code when the mobile access device passes the point of entry the second time.

Although the terms first, second, third, etc. may be used herein to describe various distances, boundaries, rates, periods, steps, elements, components, regions, layers and/or sections, these distances, boundaries, rates, periods, steps, elements, components, regions, layers and/or sections should not be limited by these terms, unless otherwise indicated. These terms may be only used to distinguish one distance, boundary, rate, period, step, element, component, region, layer or section from another step, element, component, region, layer or section. Terms such as "first," "second," and other numerical terms when used herein do not imply a sequence or order unless clearly indicated by the context. Thus, a first distance, boundary, rate, period, step, element, component, region, layer or section discussed below could be termed a second distance, boundary, rate, period, step, element, component, region, layer or section without departing from the teachings of the example embodiments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for providing ticket based authorized entry of a mobile access device, the system comprising:
   a memory configured to store an access code of a ticket of an event to be accessed by the mobile access device using the ticket, wherein the mobile access device stores the access code;
   a transceiver configured to communicate with the mobile access device; and a control module configured to determine whether the mobile access device is closer to a point of entry of the event than a check point location, update the access code stored in the memory and signal the mobile access device via the transceiver to update the access code stored at the mobile access device in response to determining that the mobile access device is closer to the point of entry than the check point location, wherein access to the event by the mobile access device and a corresponding ticket holder is based on the updated access code, when performing a first update including updating the access code stored in the memory, append a first new access code to the previously stored access code such that the updated access code is longer than the previously stored access code, when performing a second update, append a second new access code to the updated access code resulting from the first update and drop a portion of the updated access code resulting from the second update, and at least one of i) actuate an entry device of a facility of the event, ii) unlock the entry device of the facility, and iii) move the entry device of the facility, by signaling a station of the event the updated access code resulting from the dropping of the portion to obtain access for a ticket holder of the mobile access device to at least a portion of the facility.

2. The system of claim 1, wherein the control module is configured to (i) determine an amount of time since the access code of the ticket was last updated, and (ii) update the access code stored in the memory and signal the mobile access device to update the access code stored at the mobile access device in response to the amount of time since the access code of the ticket was last updated having exceeded a predetermined amount of time.

3. The system of claim 1, wherein the control module is configured to periodically, pseudo-randomly or randomly signal the mobile access device to update the access code stored in the memory and signal the mobile access device to update the access code stored at the mobile access device prior to the ticket being used to gain entry to the event.

4. The system of claim 1, wherein the control module is configured to (i) determine a location of the mobile access device, and (ii) signal the mobile access device to update the access code stored in the memory and signal the mobile access device to update the access code stored at the mobile access device when the mobile access device is within a predetermined distance of the point of entry of the event.

5. The system of claim 1, wherein the system is configured to:

receive the access code stored at the mobile access device;

compare the access code received from the mobile access device to the updated access code resulting from the second update;

determine whether the received access code from the mobile access device is valid; and in response to determining that the access code received from the mobile access device is valid, actuate the entry device to provide permitted passage to the event for the ticket holder of the mobile access device.

6. The system of claim 1, wherein the control module is configured to:

determine a location of the mobile access device relative to the check point location for the event;

determine whether the mobile access device is at or closer to the point of entry of the event than the check point location; and in response to the determining that the mobile access device is closer to the point of entry than the check point location, update the access code stored in the memory and signal the mobile access device via the transceiver to update the access code stored at the mobile access device, wherein access to the event by the mobile access device and the ticket holder is based on the access code updated in response to determining that the mobile access device is closer to the point of entry than the check point location.

7. The system of claim 6, wherein the control module is configured to iteratively, for each check point passed by the mobile access device, update the access code in the memory and the access code stored at the mobile access device.

8. The system of claim 6, wherein the control module is configured to (i) monitor movement of the mobile access device, and (ii) while the mobile access device is moving and is within a predetermined range of the check point location, update the access code stored in the memory and signal the mobile access device to update the access code stored at the mobile access device.

9. The system of claim 6, wherein the system is configured to:

receive the access code stored at the mobile access device;

compare the access code received from the mobile access device to the updated access code;

determine whether the received access code from the mobile access device is valid; and in response to determining that the access code received from the mobile access device is valid, actuate the entry device to provide permitted passage to the event for the ticket holder of the mobile access device.

10. The system of claim 6, wherein the control module is configured to update the access code stored in the memory based on an amount of time since the ticket was purchased by the ticket holder associated with the mobile access device.

11. The system of claim 1, wherein the access code is encrypted and permits the mobile access device and the ticket holder of the mobile access device access to the ticket.

12. The system of claim 1, wherein:

the control module is configured to update the access code a plurality of times respectively when the mobile access device passes a plurality of check point stations; and the check point location refers to one of the plurality of check point stations.

13. The system of claim 1, wherein the control module is configured to append a plurality of access codes to the access code stored in the memory to generate the updated access code resulting from the second update, and wherein the plurality of access codes are each provided and appended to the access code stored in the memory when the mobile access device is at a respective one of a plurality of geographical locations.

14. The system of claim 1, wherein the control module is configured to i) append the first new access code when the mobile access device passes the point of entry for the event a first time, and ii) append the second new access code and drop the portion of the updated access code resulting from the second update when the mobile access device passes the point of entry a second time or passes another point of entry of the facility.

15. The system of claim 1, wherein the portion of the updated access code matches a portion of the updated access code that existed prior to appending the second new access code.

16. A system for providing ticket based authorized entry of a mobile access device, the system comprising:

a memory configured to store an access code of a ticket of an event to be accessed by the mobile access device using the ticket, wherein the mobile access device stores the access code;

a transceiver configured to communicate with the mobile access device; and a control module configured to determine a location of the mobile access device relative to a check point location for the event, determine whether the mobile access device is at or closer to a point of entry of the event than the check point location, update the access code stored in the memory and signal the mobile access device via the transceiver to update the access code stored at the mobile access device in response to determining that the mobile access device is closer to the point of entry than the check point location, wherein access to the event by the mobile access device and a corresponding ticket holder is based on the updated access code, append a new access code to the access code stored in the memory to generate the updated access code each of a plurality of times the mobile access device is at or passes the point of entry, when the updated access code stored in the memory is updated again, append a new access code to the updated access code and drop a portion of the resulting updated access code, and at least one of i) actuate an entry device of a facility of the event, ii) unlock the entry device of the facility, and iii) move the entry device of the facility, by signaling a station of the event the updated access code resulting from the dropping of the portion to obtain access for a user of the mobile access device to at least a portion of the facility.

17. The system of claim 16, wherein the control module is configured to update the access code in response to an amount of time since the access code of the ticket was last updated exceeding a predetermined amount of time.

18. A system for providing ticket based authorized entry of a mobile access device, the system comprising:

a memory configured to store an access code of a ticket of an event to be accessed by the mobile access device using the ticket, wherein the mobile access device stores the access code;

a transceiver configured to communicate with the mobile access device; and a control module configured to determine whether the mobile access device is closer to a point of entry of the event than a check point location, update the access code stored in the memory and signal the mobile access device via the transceiver to update the access code stored at the mobile access device in response to determining that the mobile access device is closer to the point of entry than the check point location, wherein access to the event by the mobile access device and a corresponding ticket holder is based on the updated access code, i) append a first new access code to the access code stored in the memory to form an updated access code when the mobile access device passes a point of entry for the event a first time, and ii) either a) append a second new access code to the first new access code and drop a remainder of the updated access code when the mobile access device passes the point of entry a second time, or b) append the second new access code to the remainder of the updated access code and drop the first new access code when the mobile access device passes the point of entry the second time, and actuate an entry device of a facility by signaling a station of the event the updated access code to obtain access for a ticket holder of the mobile access device to at least a portion of the facility.

* * * * *